(12) United States Patent
Matsuda et al.

(10) Patent No.: US 12,245,608 B2
(45) Date of Patent: Mar. 11, 2025

(54) COMPOSITION AND METHOD FOR PRODUCING THE SAME

(71) Applicant: MEIJI CO., LTD., Tokyo (JP)

(72) Inventors: Koki Matsuda, Tokyo (JP); Fumito Miya, Tokyo (JP); Jerchyuan Lin, Tokyo (JP); Kaoru Higaki, Tokyo (JP); Hiroyuki Utsunomiya, Tokyo (JP)

(73) Assignee: MEIJI CO., LTD., Tokyo (JP)

( * ) Notice: Subject to any disclaimer, the term of this patent is extended or adjusted under 35 U.S.C. 154(b) by 0 days.

(21) Appl. No.: 17/765,234

(22) PCT Filed: Oct. 1, 2020

(86) PCT No.: PCT/JP2020/037486
§ 371 (c)(1),
(2) Date: Mar. 30, 2022

(87) PCT Pub. No.: WO2021/066119
PCT Pub. Date: Apr. 8, 2021

(65) Prior Publication Data
US 2022/0346403 A1    Nov. 3, 2022

(30) Foreign Application Priority Data

Oct. 1, 2019  (JP) .................................. 2019-181757

(51) Int. Cl.
A23G 1/00  (2006.01)

(52) U.S. Cl.
CPC ........... *A23G 1/002* (2013.01); *A23G 1/0009* (2013.01); *A23G 1/0026* (2013.01)

(58) Field of Classification Search
CPC ........ A23G 1/02; A23G 1/002; A23G 1/0009; A23G 1/0026
See application file for complete search history.

(56) References Cited

U.S. PATENT DOCUMENTS

| | | | |
|---|---|---|---|
| 1,768,230 A * | 6/1930 | Borg ..................... | A23G 1/02 426/631 |
| 5,395,635 A | 3/1995 | Yanamoto et al. | |

(Continued)

FOREIGN PATENT DOCUMENTS

| | | |
|---|---|---|
| CN | 1933736 | 3/2007 |
| GB | 2545388 | 6/2017 |

(Continued)

OTHER PUBLICATIONS

Rusconi et al., *Theobroma cacao* L., the Food of the Gods: A scientific approach beyond myths and claims. (Year: 2010).*

(Continued)

*Primary Examiner* — Erik Kashnikow
*Assistant Examiner* — Ashley Axtell
(74) *Attorney, Agent, or Firm* — Wenderoth, Lind & Ponack, L.L.P.

(57) ABSTRACT

An object of the present invention is to provide a cacao bean-derived food material showing little oil seepage and various foods using the same. A composition having a particle size distribution in the range of 10 μm to 1.5 mm and containing undisrupted cacao bean cells is provided. A composition containing undisrupted cacao bean cells, which has a free fat content ratio of 60% by weight or lower based on oil content is also provided. A composition containing 30% or more of undisrupted cells in cacao bean cells is further provided. A composition containing undisrupted cacao bean cells, which has a breaking strength of 3 kgf or lower is further provided.

9 Claims, 4 Drawing Sheets

(56) References Cited

U.S. PATENT DOCUMENTS

| | | | |
|---|---|---|---|
| 8,048,469 B2 | 11/2011 | Bradbury et al. | |
| 2007/0077318 A1* | 4/2007 | Pons-Andreu | A61P 3/02 549/405 |
| 2009/0041894 A1 | 2/2009 | William Bradbury et al. | |
| 2011/0229624 A1 | 9/2011 | Troplin et al. | |

FOREIGN PATENT DOCUMENTS

| | | |
|---|---|---|
| JP | 48-68777 | 9/1973 |
| JP | 58-851 | 1/1983 |
| JP | 7-16059 | 1/1995 |
| JP | 10-33119 | 2/1998 |
| JP | 2002-306075 | 10/2002 |
| JP | 2003-174859 | 6/2003 |
| JP | 2008-500380 | 1/2008 |
| JP | 2011-155868 | 8/2011 |
| JP | 2012-510274 | 5/2012 |
| JP | 2016-523080 | 8/2016 |
| JP | 6262387 | 12/2017 |
| JP | 2018-85947 | 6/2018 |
| JP | 2018191539 | * 12/2018 |
| JP | 6541087 | 7/2019 |
| WO | 2005/115160 | 12/2005 |
| WO | 2010/063021 | 6/2010 |
| WO | 2014/209550 | 12/2014 |

OTHER PUBLICATIONS

Decision to Grant a Patent issued Nov. 1, 2022 in Japanese Application No. 2021-551466, with English translation.
Office Action issued Jun. 28, 2022 in corresponding Japanese Patent Application No. 2021-551466, with English language translation.
URL:https:/kakakumag.Com/seikatsu-kaden/?Id=10907, Price.com Magazine, Aug. 29, 2017 [Date of Search Jun. 13, 2022].
International Search Report issued Nov. 24, 2020 in International (PCT) Application No. PCT/JP2020/037486.
International Preliminary Report on Patentability issued Apr. 5, 2022 International (PCT) Application No. PCT/JP2020/037486, with English translation.
Tamura et al., "Comparative Study of the Textural Properties and Microstructure of "An" Paste Prepared from Azuki Bean, Kidney Bean, Peanut and Soybean", Journal of the Japan Society of Home Economics, 1999, vol. 50, No. 4, pp. 323-332 English Abstract, and cited in specification.
Office Action issued Jan. 20, 2023 in corresponding Chinese Patent Application No. 202080068921.5, with English language translation.
Chinese Office Action issued Oct. 26, 2023 in corresponding Chinese Patent Application No. 202080068921.5, with English machine translation.
Extended European Search Report issued Oct. 9, 2023 in corresponding European Patent Application No. 20870811.5.
Second Office Action issued Jul. 29, 2023 in corresponding Chinese Patent Application No. 202080068921.5, with English language translation.
Office Action issued Sep. 20, 2024 in corresponding European Patent Application No. 20870811.5.

* cited by examiner

[Figure 1]
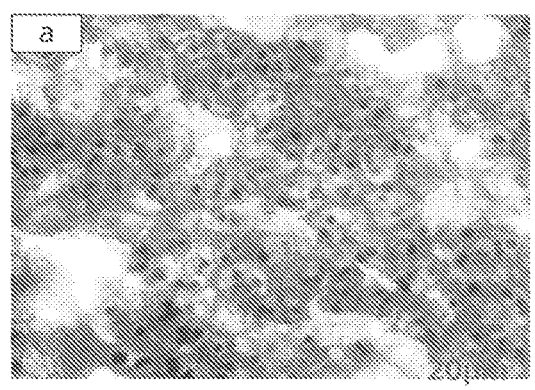
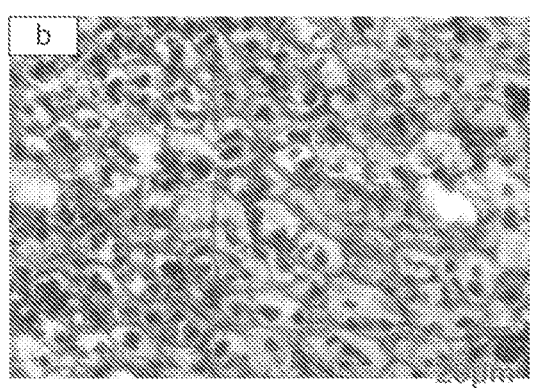
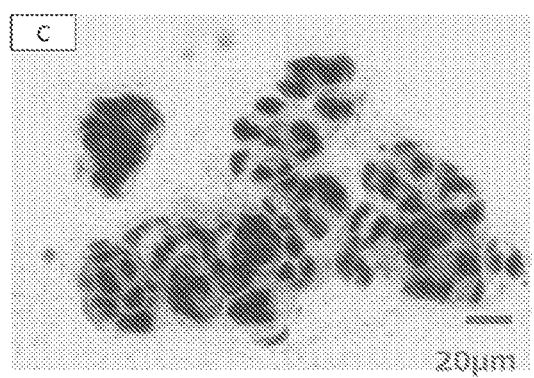
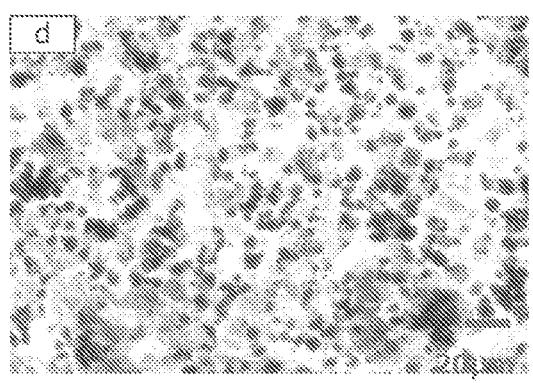

[Figure 2]
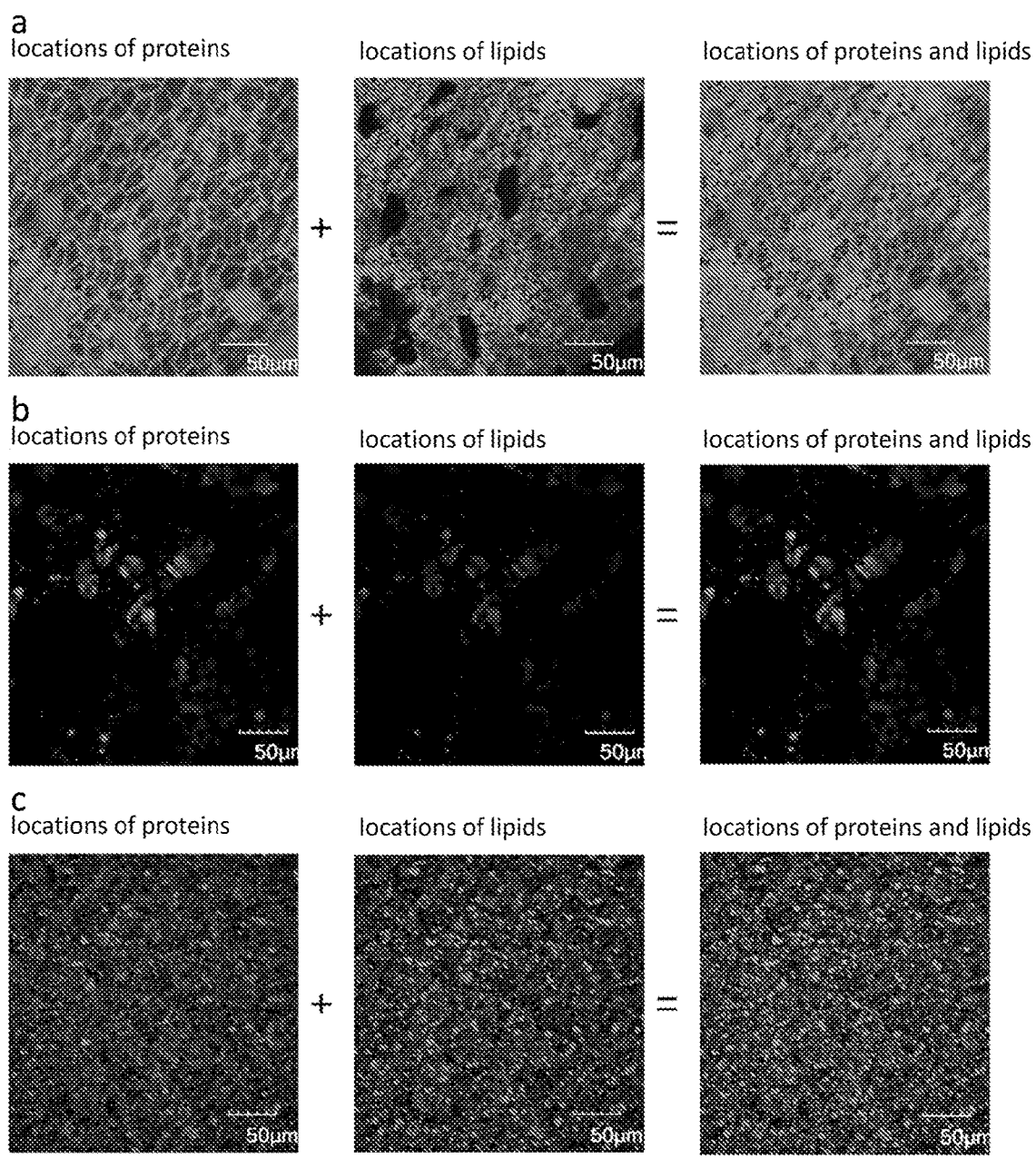

[Figure 3]
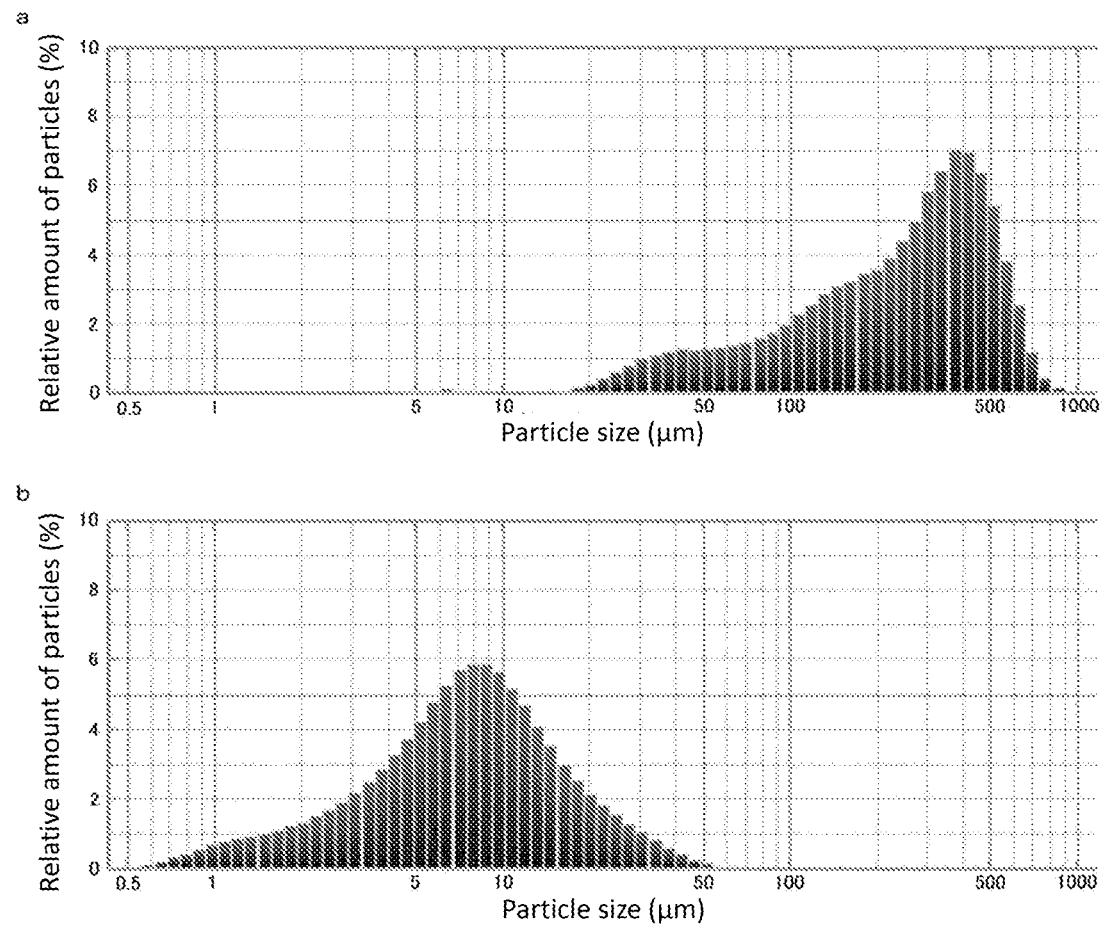
[Figure 4]
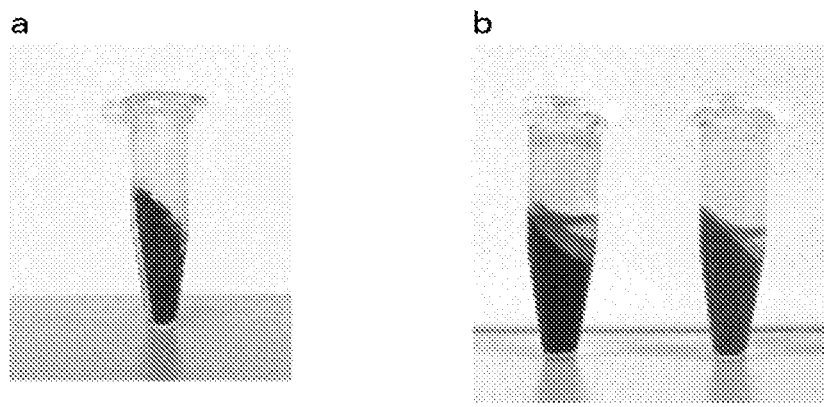

[Figure 5]
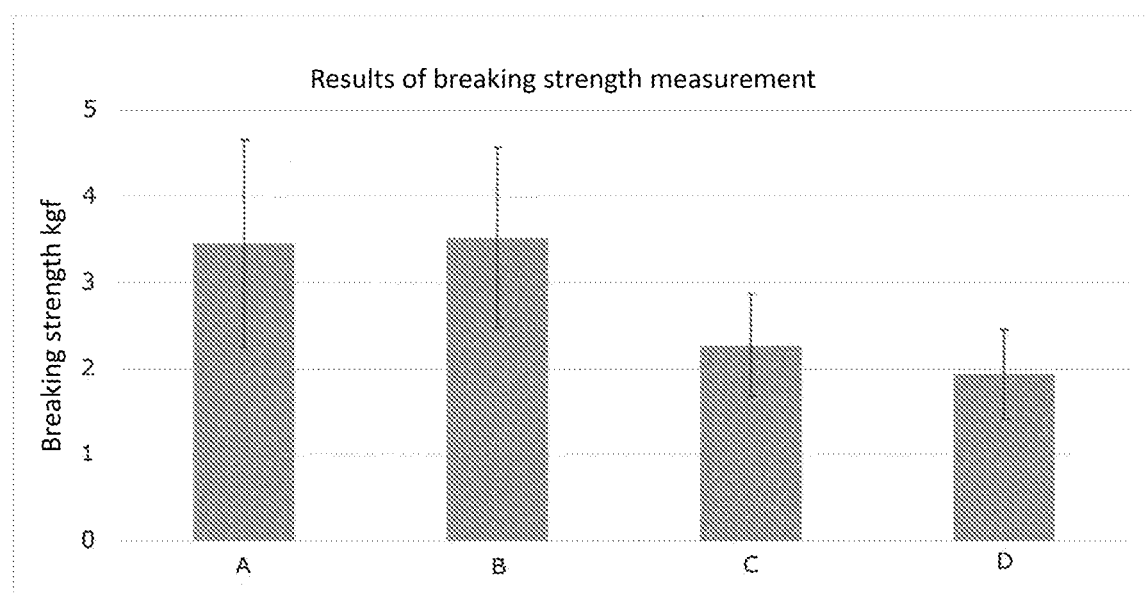

COMPOSITION AND METHOD FOR PRODUCING THE SAME

TECHNICAL FIELD

The present invention relates to a composition made from cacao beans as a raw material and a method for producing the same.

BACKGROUND ART

Cacao beans, the raw material of chocolate, are rich in polyphenols. Cacao beans are generally fermented and dried in the production country, and then exported, and they are processed, for example, roasted and ground, and made into chocolate in factories.

Cacao mass and cocoa powder are conventionally well known as processed products of cacao beans, but several other products have also been examined. For example, Patent document 1 proposes a method for processing cacao nibs used as a raw material for chocolate and cocoa powder, which comprises subjecting the nibs to a steaming treatment, adding an appropriate amount of enzyme to the nibs, allowing them to react together with water at 30 to 60° C., then drying and roasting them, as a method that can improve the crispiness of cacao nibs, remove the bad smell of cacao nibs, and shorten the conching time in chocolate production. It is described that the nibs obtained by this method can be used not only for chocolate, but also for other confectioneries such as candies, caramel, cakes, and biscuits, and thus they can be used as a raw material for a wide range of confectioneries. Patent document 2 proposes, as a method for processing beans for non-essential flavored beverages such as cacao beans and coffee beans into a novel food product that can be directly ingested, a method for producing seasoned beans for non-essential flavored beverages, which comprises soaking the beans in water or a dilute salt solution, removing them from the water or solution, then immersing them in a seasoning solution for such a period of time that the seasoning solution is absorbed by the beans for non-essential flavored beverages, then taking out and drying them. In is explained that, in this method, by pre-treating the beans by immersing them in water or a dilute salt solution prior to seasoning them by immersing them in a seasoning solution, the bitterness commonly possessed by beans for non-essential flavored beverages can be suppressed, and seasoned beans having a sweet and soft texture can be obtained, and such seasoned beans can be directly eaten. Further, Patent document 3 proposes, as a method for obtaining cacao beans having reduced polyphenol oxidase activity and high polyphenol content, treating non-fermented and non-roasted raw material cacao beans through a process consisting of a combination of steaming with aqueous steam and drying. It is explained in this document that the total polyphenol content of the cacao beans after steaming ranges from 0 to 30 g per 100 g of the cacao beans, and the low molecular weight polyphenol content of the same ranges from 0 to 20 g per 100 g of the cacao beans. It is also explained that cacao liquor, cocoa powder or extracts with a high polyphenol content can be produced from the obtained cacao beans, and that products derived from such cacao beans can be used in confectionery products, chocolate and cacao-containing products.

Meanwhile, as for bean paste not containing sugar obtained by boiling, grinding, and weight-dehydrating adzuki beans, kidney beans, peanuts beans or soybeans, and kneaded bean paste produced by adding bean paste not containing sugar to a sugar solution and kneading them, presence of starch, shape and texture characteristics of bean paste particles, and so forth have been reported (Non-patent document 1). In this report, the bean paste was also produced by using kidney beans, peanuts beans, and soybeans, which are not normally used as a raw material of usual bean paste, in addition to adzuki beans, but use of cacao beans is not mentioned. In general, it is believed that beans with a high starch content are suitable for bean paste, and cacao beans have a lower starch content and a higher oil content compared with any of adzuki beans, kidney beans, peanuts beans, and soybeans. Therefore, cacao beans are generally processed by grinding them in their dry state after roasting so that they come to have characteristic aroma and physical properties.

PRIOR ART REFERENCES

Patent Documents

Patent Document 1: Japanese Patent Unexamined Publication (Kokai) No. Sho 48-068777
Patent Document 2: Japanese Patent Unexamined Publication (Kokai) No. Hei 10-033119
Patent Document 3: U.S. Pat. No. 8,048,469

Non-Patent Document

Non-patent document 1: Journal of the Japan Society of Home Economics, Vol. 50, No. 4, pp 323-332, 1999

SUMMARY OF THE INVENTION

Object to be Achieved by the Invention

Cacao mass and cocoa powder, which are conventional cacao bean processed products, are incompatible with water due to oil seepage, making it difficult to use them in aqueous foods (foods in which water constitutes the continuous phase) such as yokan (Japanese sweet bean jelly) and smoothies in many cases. In addition, cacao beans contain cacao polyphenols that have various physiological functions, but many of them are lost in the common processing steps such as fermentation and roasting. Moreover, chocolate, which is a typical oil-based food product using cacao beans processed product, usually does not retain its shape in a high temperature range of 30° C. or higher, making distribution thereof in summer and tropical regions difficult.

An object of the present invention is to provide a food material using cacao beans, which is made from cacao beans, and shows little oil seepage. Such a food material preferably has a high polyphenol content. Furthermore, such a food material can preferably be used not only for chocolate products, but also for various other food products.

Means for Achieving the Object

The inventors of the present invention conducted various researches in order to achieve the aforementioned object, and as a result, they obtained a novel composition as a food material containing undisrupted cells from raw material cacao beans. They also found that such a composition has such characteristics as less oil seepage, and is useful as a food material, and accomplished the present invention.

The present invention provides the followings.

[1] A composition having a particle size distribution in the range of 10 μm to 1.5 mm and containing undisrupted cacao bean cells.

[2] A composition having a free fat content of 30% by weight or lower based on oil content.

[3] A composition containing 30% or more of undisrupted cells in cacao bean cells.

[4] A composition containing undisrupted cacao bean cells, which has a breaking strength of 3 kgf or lower.

[5] A composition obtainable by a production method comprising:
 the step of heating raw material cacao beans in the presence of moisture to obtain heating treated cacao beans, and
 the step of grinding the resulting heating treated cacao beans.

[6] The composition according to any one of 1 to 5, which has a polyphenol content of 1 to 10% by weight based on solid content.

[7] A food containing the composition according to any one of 1 to 6.

[8] A method for producing a composition, which comprises:
 the step of heating raw material cacao beans in the presence of moisture to obtain heating treated cacao beans, and
 the step of grinding the resulting heating treated cacao beans.

[9] A method for producing a composition having a low free fat content, which comprises the step of heating raw material cacao beans in the presence of moisture.

The present invention also provides the followings.

[1] A composition having a particle size distribution in the range of 10 μm to 1.5 mm and containing undisrupted cacao bean cells.

[2] The composition according to 1, which has a free fat content of 30% or lower based on oil content.

[3] The composition according to 1 or 2, which contains 30% or more of undisrupted cacao bean cells in cacao bean cells.

[4] A composition containing undisrupted cacao bean cells, which has a free fat content of 60% or lower based on oil content.

[5] The composition according to 4, which has a free fat content of 30% or lower based on oil content.

[6] A composition containing 30% or more of undisrupted cacao bean cells in cacao bean cells.

[7] A composition containing undisrupted cacao bean cells, which has a breaking strength of 3 kgf or lower.

[8] A composition containing a ground product of cacao beans that have been subjected to a wet heating treatment.

[9] A composition obtainable by a production method comprising:
 the step of heating raw material cacao beans in the presence of moisture to obtain heating treated cacao beans, and
 the step of grinding the resulting heating treated cacao beans.

[10] The composition according to any one of 1 to 9, which is in the form of paste.

[11] The composition according to any one of 1 to 9, which is in the form of powder.

[12] The composition according to any one of 1 to 11, which has a polyphenol content of 1 to 10% by weight based on solid content.

[13] A food containing the composition according to any one of 1 to 12.

Effect of the Invention

According to the present invention, a food material made from cacao beans and showing little oil seepage can be obtained.

BRIEF DESCRIPTION OF THE DRAWINGS

FIG. 1 Microphotographs of various cacao bean processed products: a) unfermented raw cacao beans, b) cacao beans subjected to a heating treatment step, c) product according to the invention, and d) cacao mass.

FIG. 2 Confocal microphotographs of various cacao bean processed products: a) dried cacao beans (unfermented), b) product according to the invention, and c) cacao mass.

FIG. 3 Particle size distributions: a) product produced according to the present invention using a 60-mesh sieve, and b) cacao mass.

FIG. 4 Photographs of products after weighed in an amount of approximately 2 g in a microtube and centrifuged (16,000 rpm for 10 minutes): a) product according to the present invention, b) left, cacao mass; and right, commercial milk chocolate.

FIG. 5 Results of breaking strength measurement: A, unfermented dried cacao beans; B, unfermented roasted cacao beans: C, unfermented boiled (1 hour) and dried cacao beans; and D, unfermented boiled (2 hours) and dried cacao beans.

MODES FOR CARRYING OUT THE INVENTION

[Composition]
[Major Characteristics]

The composition of the present invention is a material processed from cacao beans as a raw material and has the following characteristics:
 1) containing undisrupted cacao bean cells, and
 2) having a particle size distribution of 10 μm to 1.5 mm.
In some aspects, it may have the following characteristic:
 3) having a weight ratio of free-fat content of 60% or lower based on oil content. Concerning the present invention, proportions or ratios of ingredients contained in a composition or the like are based on weight, unless especially stated.
In some aspects, it may have the following characteristic:
 4) a ratio of number of undisrupted cells of 30% or higher in the cacao bean cells.
In some aspects, it may have the following characteristics:
 1) containing undisrupted cacao bean cells, and
 5) having a breaking strength of 3 kgf or lower.

The composition of the present invention does not contain whole raw material cacao beans. Examples of whole raw material cacao beans include natural cacao beans themselves and fermented cacao beans themselves. Further, the composition of the present invention does not contain existing cacao nibs. Cacao nibs correspond to cacao beans from which the shells have been removed, which have not been heated in the presence of moisture. However, cacao nibs include those that have been subjected to a heating pasteurization and/or roasting commonly used in usual chocolate and cacao production. The cacao nibs also include a grinding product of those mentioned above.

One of the characteristics of the composition of the present invention is that it is heated in the presence of moisture (subjected to wet heating). The presence or absence of moisture during the heating treatment of cacao beans can affect the ingredients and composition of the treated cacao beans. Examples of the wet heating include boiling, steaming, stewing, and microwave heating in the presence of moisture. The term "wet heating" does not include heating for the purpose of sterilization or roasting. The temperature and time for the wet heating preferably constitute such conditions that the contained polyphenol oxidase can be inactivated to a certain extent, and the product is softened so that the breaking strength thereof is within a certain range, as described later.

A cacao bean processed product that has been heated in the presence of moisture and ground so as to leave a relatively large number of undisrupted cells is provided for the first time by the present invention. Accordingly, implementations of not only such cacao bean processed products (wet-heated and ground products) and dried products thereof (wet-heated, ground and dried products), but also wet-heated cacao beans (wet-heated beans) and dried products thereof (wet-heated and dried beans) for such grinding, ground products of wet-heated and dried beans (wet-heated, dried and ground products), and dried products of cacao beans (dried beans) for wet heating and grinding all may be direct or indirect implementation of the composition of the invention.

One of the characteristics of the composition of the present invention is that it has a special particle size distribution, and conventional cacao bean processed products and the composition of the present invention can be mentioned in the order of from smaller to larger particle size as follows: cacao mass and cacao liquor, the composition of the present invention, cacao nibs, and whole beans. Common cacao mass has such a particle size distribution that 98% or more of the particles are in the range of 0.5 to 100 μm, and shows a single peak, which peak is in the range of 5 to 20 μm. The particle size of cacao nibs depends on the degree of grinding, but usually in such a range that the particles are visible, and hardly pass through a sieve with a mesh opening of 1 mm.

(Raw Material Cacao Beans)

The term cacao bean refers to a seed of cacao (*Theobroma cacao*), and the variety or origin of the cacao beans used as the raw material for the composition of the present invention are not particularly limited. Examples of cacao varieties include Forastero, Criollo, Trinitario varieties, derivatives and hybrids thereof. Examples of the regions of production include Ghana, Cote d'Ivoire, Nigeria, Brazil, Venezuela, and Trinidad and Tobago.

In general, cacao beans used as a raw material for chocolate are extracted from cacao pods (cacao nuts) together with pulp, fermented, and dried. However, the raw material cacao beans used for the cacao bean processed products of the present invention are not particularly limited concerning use or non-use, or degree of processing so long as they contain undisrupted cacao bean cells. Examples of the processing of cacao beans include fermentation, removal of pulp, drying, roasting, and enzyme deactivation treatment.

From the viewpoint of obtaining a composition having a high polyphenol content, it is preferred that the raw material cacao beans have not undergone a process in which polyphenols are reduced. Polyphenols are reduced by the actions of enzymes promoted under the fermentation conditions and high temperatures. Therefore, it is preferred that the raw material cacao beans preferably used in the present invention have not been fully fermented and have not been roasted. The expression of fully fermented means that the cacao beans have been fermented for 7 days or longer after harvesting.

From the viewpoint of obtaining a composition having a vivid color tone, it is preferred that the raw material cacao beans are fresh cacao beans immediately after extraction from the cacao pods or such fresh cacao beans from which the pulp has been immediately removed. It is also preferred that such fresh cacao beans are immediately treated to inactivate enzymes contained in the cacao beans, such as polyphenol oxidase. This is because the remaining polyphenol oxidase activity contained in the cacao beans acts on the polyphenols of the cacao beans and changes the color to a dark brown tone.

From the viewpoint of obtaining a composition having a low free fat content, it is preferred that the raw material cacao beans are whole beans. This is because, depending on the degree of grinding, the cacao bean cells are disrupted, and the oil or fat contained in the cells are released.

(Form and Particle Size Distribution of the Composition of the Present Invention)

The composition of the present invention can be said to be a ground product of cacao beans. The size obtained by grinding of cacao beans is not limited so long as the resulting composition contains undisrupted cacao bean cells as described later. Cacao bean cells vary in size, but the smallest diameter is about 10 μm, and therefore the composition of the present invention may contain particles of about 10 μm or larger. The aforementioned particles refer to cacao bean cells themselves, or aggregates of cacao bean cells. The aforementioned aggregates of cacao bean cells include cacao bean cells that are not separated and remain in a state of a tissue of adhered cells, as well as cacao bean cells that are once separated and then aggregated. The particle size distribution of the composition of the present invention is, for example, 10 μm to 1.5 mm, preferably 10 μm to 1.2 mm, more preferably 10 μm to 1 mm.

Concerning the present invention, the particle size distribution refers to the degree of distribution of the sizes of particles contained in an objective composition, unless especially stated. Also concerning the present invention, the expression that the particle size distribution of the composition is within a specific range means that particle sizes of 70% or more, preferably 80% or more, more preferably 90% or more, still more preferably 95% or more, even more preferably 98% or more, of particles are in the specific range as determined by laser diffraction particle size distribution measurement, unless especially stated. The % value used here is a value based on volume (relative particle volume).

The median diameter of the particles contained in the composition of the present invention is between 200 and 400 μm, preferably 240 to 380 μm, more preferably 280 to 360 μm, still more preferably 300 to 340 μm. The mode diameter is 280 to 480 μm, preferably 310 to 460 μm, more preferably 350 to 430 μm, even more preferably 370 to 410 μm. The average diameter is between 150 and 350 μm. The relative amount of particles having a particle size in the range of 0.2 mm to 0.7 mm contained in the composition of the present invention is 5% or larger. The measurement is performed on the volumetric basis by a laser diffraction particle size distribution measurement method.

The means for grinding is not particularly limited, and examples include grinding with a mixer or the like, and straining through a sieve with a mesh opening larger than the size of cacao bean cells.

The composition of the invention can also be in the form of a paste or a dried product thereof. In other words, the composition of the present invention can be a ground product of heating treated cacao beans. According to one embodiment of the composition of the present invention, it is a material in a state that it can be easily ground obtained by a method of heating in the presence of moisture, such as boiling, steaming, stewinging, and microwave heating. By the heating treatment, polyphenol oxidase contained in the cacao beans has been inactivated. In addition, the heating treated cacao beans are considered to be in a state that the raw material cacao beans can be separated into cell units. The paste may be in a state that relatively large solids are contained, like bean paste containing whole adzuki beans.

The composition of the invention in the form of paste contains 15% or more, preferably 20% or more, more preferably 25% or more, or still more preferably 30% or more, of moisture. The maximum moisture content of the composition of the present invention in the form of paste is not particularly limited so long as it is in the form of paste, and it is, for example, 70% or lower, preferably 60% or lower, more preferably 55% or lower, still more preferably 40% or lower, irrespective of the minimum content. The moisture content of the composition of the invention in the form of a dry product, more specifically in the form of powder, is 5% or lower, preferably 4% or lower, more preferably 3.5% or lower, still more preferably 3% or lower. The minimum moisture content of the composition of the invention in the form of powder is not particularly limited, and can be, for example, 0%, 0.1% or lower, 0.5% or lower, or 1% or lower, irrespective of the maximum content.

(Containing Undisrupted Cacao Bean Cells)

The composition of the present invention contains undisrupted cacao bean cells. The term "undisrupted" means that the cell membrane has not been disrupted. It can be determined whether or not a subject composition contains such undisrupted cacao bean cells by observing it with a microscope or the like to determine whether or not presence of cells surrounded by cell membranes can be confirmed. If the cacao bean cells are not disrupted, lipids and proteins remain inside the cells. Therefore, whether or not undisrupted cacao bean cells are contained can be determined by staining the proteins and lipids, and observing them to determine whether or not the locations of the proteins and lipids are the same.

A higher ratio of undisrupted cacao bean cells to the cacao bean cells contained in the composition of the present invention is preferred from the viewpoint of not releasing free fats from the cells, and so forth. The ratio of undisrupted cacao bean cells to cacao bean cells can be calculated from the number of total cells and the number of undisrupted cacao bean cells, which are confirmed in a certain region of a cacao bean processed product by observing it with a microscope. Specifically, the following method is used.

(1) Add 2 ml of water to 0.03 g of a sample, and stir the mixture. Then, add 0.5 ml of a 0.01% methylene blue solution to the mixture, stir the resulting mixture, drop the mixture onto slide glass, place cover glass on it, and observe it with a microscope (magnification, 450×).

(2) The size (A) and the number of disrupted cells (B) in a region of the sample are obtained from the observed image or an image captured from it, by using image analysis software, if necessary. The number of disrupted cells can be obtained by visually selecting and counting the disrupted cells contained in the region.

(3) Calculate the area size (C) of one undisrupted cell as a circle with a radius of 10 μm (10×10×3.14=314 μm$^2$).

(4) Calculate the total number of cells (D) by dividing the area size (A) by the area size of one undisrupted cell (C).

(5) Calculate the ratio of undisrupted cells in cacao bean cells (%) in accordance with the following equation. At this time, for 5 or more, preferably 10 or more, of regions where the total number of cells (D) is in the range of 100 to 300, the value for each region can be calculated in accordance with the following equation, and the average of the obtained values may be used as the ratio of undisrupted cells in the cacao bean cells of the sample.

$$\text{Ratio of undisrupted cells in cacao bean cells (\%)} = (D-B)/D \times 100$$

This ratio of the composition of the invention is, for example, 30% or higher, preferably 40% or higher, more preferably 50% or higher, still more preferably 60% or higher, still more preferably 70% or higher, still more preferably 80% or higher, still more preferably 90% or higher, most preferably 100%.

Ingredients such as oils, fats and polyphenols of undisrupted cacao bean cells are maintained in the cells, since the cell membranes of the undisrupted cacao bean cells are not disrupted. Cacao mass, which is a common cacao bean processed product, is usually finely ground to a diameter of about 20 μm or smaller in the production process. Therefore, oils, fats, polyphenols, and so forth are released from the disrupted cacao bean cells and present in the cacao mass. On the other hand, in the composition of the present invention, the oil or fat content and polyphenols derived from cacao beans are sealed in the cacao bean cells whose cell membranes have not been disrupted, and therefore it has a characteristic that those ingredients hardly seep out.

(Free Fat Content Ratio)

The composition of the present invention has a low free fat content ratio based on oil content. In the field of chocolate, free fat refers to a fat or oil existing in a free form in a material. The free fat affects the flowability and viscosity of chocolate. In addition, it is thought that, from a material containing a lot of free fats, oils tend to easily seep out.

The free fat content ratio based on oil content (also referred to simply as free fat content ratio) referred to for the present invention is represented with a value measured and calculated by the following method, unless especially stated. That is, it means a ratio of free fats (on weight basis) in the oils or fats contained in the subject composition.

Measurement of Free Fat Content (1) Put about 5 g of a sample (a) into a 50-ml centrifuge tube.

(2) Add 25 ml of n-hexane.

(3) Shake the tube 130 times/minute for 3 minutes with an amplitude of 4 cm.

(4) Centrifuge the mixture at 3000 rpm and 4° C. for 10 minutes.

(5) Measure the weight (b) of a 100-ml conical flask (6) Transfer the supernatant obtained in (4) onto filter paper to filter it, and collect the filtrate in the 100-ml conical flask.

(7) Evaporate n-hexane by blowing nitrogen gas.

(8) Evaporate n-hexane by holding the residue in a vacuum constant temperature dryer at 98° C. for 4 hours under reduced pressure.

(9) Measure the weight (c) of the conical flask after air cooling in a desiccator.

Free fat content ratio in the composition (free fat content ratio based on sample weight) (%)= $(c-b)/a \times 100$       <x>

Free fat content ratio based on oil content (%)=<x>/ oil content in $a \times 100$       <y>

Free fat content ratio based on solid content (%)=<x>/($a$−moisture in $a$)×100       <z>

The free fat content ratio based on oil content of the composition of the invention is, for example, 60% or lower, preferably 50% or lower, more preferably 40% or lower, still more preferably 30% or lower, still more preferably 28% or lower, still more preferably 20% or lower, still more preferably 16% or lower, still more preferably 10% or lower. For particularly low oil seepage and excellent compatibility with aqueous foods, the free fat content ratio based on oil content of the composition of the invention is preferably 30% or lower.

The free fat content ratio based on solid content of the composition of the present invention is, for example, 42% or lower, preferably 30% or lower, more preferably 25% or lower, still more preferably 20% or lower, still more preferably 16% or lower, still more preferably 14% or lower, still more preferably 8% or lower, still more preferably 5% or lower. For particularly low oil seepage and excellent compatibility with aqueous foods, the free fat content ratio based on solid content of the composition of the present invention is preferably 16% or lower.

The free fat content ratio in the composition of the present invention is, for example, 41% or lower, preferably 25% or lower, more preferably 20% or lower, still more preferably 15% or lower, still more preferably 14% or lower, still more preferably 10% or lower, still more preferably 8% or lower, still more preferably 5% or lower. For particularly low oil seepage and excellent compatibility with aqueous foods, the free fat content ratio in the composition of the present invention is preferably 10% or lower.

The free fat content ratio of unprocessed cacao beans is generally low, but the free fat content of conventional cacao bean processed products is high, because the cells are disrupted during the production processes. On the other hand, in the composition of the present invention, the oils or fats derived from cacao beans are sealed in the cacao bean cells having undisrupted cell membranes, and therefore the composition of the present invention has a distinctive characteristic not found in conventional cacao bean processed products, namely, a low free fat content ratio despite that it contains a reasonably high concentration of oils or fats derived from cacao beans.

(Polyphenol Content)

The composition of the present invention has a high polyphenol content. In addition, the composition of the present invention has a high procyanidin content. This is because the polyphenol oxidase contained in the cacao beans has been inactivated by the heating treatment.

The minimum polyphenol content of the composition of the invention is, for example, 1.8% or higher, preferably 2.0% or higher, more preferably 2.4% or higher, still more preferably 2.8% or higher, still more preferably 3.2% or higher, still more preferably 3.6% or higher, still more preferably 3.8% or higher, still more preferably 4.0% or higher, based on the solid content. The maximum polyphenol content in the composition of the present invention is, for example, 10% or lower, preferably 8% or lower, more preferably 7.6% or lower, still more preferably 7.2% or lower, still more preferably 6.8% or lower, still more preferably 6.4% or lower, based on solid content, irrespective of the minimum content.

Concerning the present invention, the polyphenol content is represented by a value measured by the Folin-Ciocalteu method and calculated in terms of (−)-epicatechin, unless especially stated. For the method of measuring the polyphenols by the Folin-Ciocalteu method, reference can be made to "Cacao Polyphenol Measurement Method" attached to the "Labeling Standards for Cacao Polyphenols in Chocolates" of the Japan National Chocolate Industry Fair Trade Council. Since the polyphenols contained in the composition of the present invention are derived from the cacao beans, they may also be referred to as cacao polyphenols. Further, since the polyphenol content of the composition of the present invention is a value measured as the total amount of various polyphenol compounds, it may be referred to as total polyphenol content, polyphenol total content, or the like.

The composition of the present invention preferably contains a large amount of procyanidins among the polyphenols. The minimum procyanidin content of the composition of the present invention is, for example, 0.2% or higher, preferably 0.3% or higher, more preferably 0.5% or higher, still more preferably 0.7% or higher, still more preferably 1.1% or higher, still more preferably 1.3% or higher, still more preferably 1.5% or higher, still more preferably 1.7% or higher, based on solid content. The maximum procyanidin content of the composition of the present invention is, for example, 5% or lower, preferably 4% or lower, more preferably 3.5% or lower, still more preferably 3.0% or lower, still more preferably 2.7% or lower, still more preferably 2.2% or lower, based on solid content, irrespective of the minimum content.

Concerning the present invention, the procyanidin content refers to the amount of catechin, epicatechin, procyanidin B2, procyanidin B5, procyanidin C1, and cinnamtannin A2 measured by HPLC.

(Braking Strength)

The composition of the present invention may be heating treated in the presence of moisture as described later, and thereby softened so that the breaking strength is in a certain range. The breaking strength of the composition of the present invention is, for example, 3 kgf or lower, preferably 2.87 kgf or lower, more preferably 2.49 or lower, still more preferably 2.46 or lower, still more preferably 2.28 kgf or lower. The minimum value of the same can be 0.5 kgf or higher, preferably 1.0 kgf or higher, more preferably 1.42 kgf or higher, still more preferably 1.69 kgf or higher, irrespective of the maximum value.

Concerning the present invention, the breaking strength is measured as follows, unless especially stated.

Measure the breaking strength for a sample dried at 100° C. for 4 hours or longer under reduced pressure with a rheometer using a cylindrical plunger having a diameter of 3 mm for a penetration depth of 4.0 mm at a penetration speed of 2 cm/minute. The temperature of the sample should be 22 to 24° C. If the obtained measurement value varies, perform the measurement for an appropriate number of samples. Although the appropriate number of samples can be appropriately determined by those skilled in the art, for example, 50 samples may be taken from one composition, and the average value of the 50 measured values may be used as the breaking strength of the composition.

(Other Raw Materials)

The compositions of the present invention may contain additives acceptable for foods. Examples of such additives are sweeteners, antioxidants, flavors, acidulants, excipients, surfactants, binders, disintegrants, lubricants, dissolution aids, suspending agents, coating agents, colorants, preservatives, buffers, pH adjusters, emulsifiers, stabilizers, and so forth.

[Production Method]

The present invention also provides a method for producing a composition, which comprises the following steps:
the step of heating-treating raw material cacao beans in the presence of moisture to obtain heating treated cacao beans, and
the step of grinding the resulting heating treated cacao beans.

The present invention also provides a production method suitable for obtaining a composition having a low free fat content ratio, which comprises:
the step of heating-treating raw material cacao beans in the presence of moisture to obtain heating treated cacao beans, or
the step of processing the raw material cacao beans so that the raw material cacao beans can be easily separated into cell units.

The means for the heating treatment in the production methods of the present invention is not particularly limited, so long as it is a means for heating in the presence of moisture, and enables such processing of the raw material cacao beans that the subsequent grinding process can be easily carried out, and the polyphenol oxidase contained in the cacao beans is preferably inactivated. Examples of the means for heating include boiling (also referred to as heating by boiling), steaming, stewing, and microwave heating.

The temperature and time for the heating treatment should preferably correspond to such conditions that the polyphenol oxidase can be inactivated to a certain extent, and the breaking strength of the raw material cacao beans can be made to be the value described above. Examples of such conditions include boiling by heating by boiling in water at 80° C. or higher, preferably 90° C. or higher, more preferably in seething water, for 10 minutes or longer, preferably 20 minutes or longer, more preferably 30 minutes or longer.

The heating treatment in the presence of moisture provides a high heat conductivity because water is used as a heat medium. It is also thought that the cell walls and/or the adhesive parts between the cell walls of cacao beans can be softened by appropriately controlling the temperature and time of heating.

The means for grinding used in the production method of the present invention is not particularly limited, so long as a composition containing undisrupted cacao bean cells can be obtained. The size of the ground material is not limited. The minimum particle size is the size of the cacao bean cell, for example, about 20 μm in diameter.

The means for grinding is not particularly limited, and examples thereof include grinding with a mixer or the like, and straining (mashing) using a sieve having a mesh opening larger than the size of a cacao bean cell. Examples of the device for straining include a sieve of 32 mesh, 60 mesh, or the like made of stainless steel, and so forth. Examples of the equipment for grinding include a kneader widely used for production of bean paste.

[Food Using the Composition of the Present Invention]

The composition of the present invention can be used as a raw material in the manufacture of a food or pharmaceutical product. Although the following description will be given for foods as an example among the foods and pharmaceuticals, those skilled in the art can understand how the description will be applied to pharmaceutical products.

The foods include not only those for humans, but also those for animals other than humans, unless especially stated. The foods include general foods, functional foods, and nutritional compositions, therapeutic foods (foods that can achieve therapeutic purposes; foods prepared on the basis of a menu prepared by a nutritionist, etc. in accordance with a diet slip prescribed by a medical practitioner), dietetic food, food with adjusted ingredients, nursing care foods, and foods for therapeutic support, unless especially stated. The foods include not only solid foods but also liquid foods such as beverages, drink preparations, liquid foods, and soups, unless especially stated.

The functional foods refer to foods that can impart a predetermined functionality to a living body, and generally include health foods, for example, foods for specified health uses (including conditional foods for specified health uses [Tokuho]), foods with function claims, foods with health claims including foods with nutrient function claims, foods for special dietary uses, nutritional supplement foods, health supplement foods, supplements (for example, those of various kinds of dosage forms such as tablets, coated tablets, sugar-coated tablets, capsules, and solutions), cosmetic foods (for example, diet foods), and so forth. In addition, concerning the present invention, the functional foods also include health foods to which a health claim based on the Codex Alimentarius (Joint FAO/WHO Food Standards Programme Codex Committee) is applied.

The composition of the present invention has a low free fat content, and shows superior compatibility with water, because oil does not easily seep out from it. From these points of view, examples of foods to which the composition of the present invention can be preferably applied include oil-based foods, as well as water-based foods to which it has been difficult to apply conventional cacao bean processed products. The oil-based foods are foods in which oil or fat constitutes the continuous phase. The water-based foods refer to foods in which water constitutes the continuous phase.

The composition of the present invention can also be used in food products other than chocolate products, in addition to chocolate products.

Foods using the composition of the present invention as a raw material can be made in any form, such as confectioneries, beverages, seasonings, processed foods, prepared foods, and soups. More specifically, they can be chocolate products (chocolate, quasi-chocolate, chocolate confectionery, quasi-chocolate confectionery, etc.), gummies, tablet confectioneries, chewing gum, candies, snacks, biscuits, crackers, yokan, bean pastes, ice creams, ice confectioneries, jellies, puddings, fillings, soft drinks, smoothies, fruit juice beverages, vegetable beverages, soy milk beverages, tea beverages, coffee beverages, powdered beverages, carbonated beverages, alcoholic beverages, spreads, margarine, flavor seasonings, dressings, sauces, tare (Japanese sauce for dipping or topping), tsuyu (Japanese soup or dipping sauce), roux, yogurt, cream, cheese, dairy beverages, lactic acid bacteria beverages, bread, pasta, pizza crust, cakes, cakes mixes, prepared milk powders, liquid diets, foods for the sick, nutritional foods, supplements, tablets, frozen foods, retort foods, canned foods, foods for microwave oven, instant soups, instant noodles, and tofu.

In addition, the composition of the present invention has a high polyphenol content. From this point of view, examples of the foods to which the composition of the present invention can be preferably applied include foods to which a high polyphenol content is desired.

The content of the composition of the present invention in a food is not particularly limited, and may be appropriately determined according to the form of the food, and so forth. For example, the content of the composition of the present invention in a food may be 1 to 99%, 10 to 90%, 20 to 60%, and so on.

Foods containing the composition of the present invention may contain other food raw materials, other active ingredients or nutritional ingredients acceptable for foods, in addition to the composition of the present invention. The composition may also contain additives acceptable for foods.

In the production of a food, the stage of blending the composition of the present invention is not particularly limited, so long as the characteristics of the composition of the present invention are not significantly impaired. For example, it can be mixed with other raw materials and blended at an early stage of production.

The composition of the invention and a food using the composition can be labeled with an indication that it contains cacao beans processed product, that it contains a large amount of cacao beans processed product, that it contains polyphenols, that it contains a large amount of polyphenols, or effects that can be expected from polyphenols, and labeled with an indication that the intake of the food is recommended for a specific target. The indication can be a direct or indirect indication. Examples of the direct indication include indications on tangible objects such as the product itself, package, container, label, tag, of the product, etc. Examples of the indirect indication include advertisement or publicity on such places or by such means as websites, storefronts, pamphlets, exhibitions, books, newspapers, magazines, television, radio, mails, e-mails, and voices.

Hereafter, the present invention will be more specifically explained with reference to the following examples.

EXAMPLES

[Production and Analysis of the Composition of the Present Invention]

The following materials were prepared and produced.
(Cacao Bean Raw Material A)

Cacao beans with pulp extracted from cacao pods were used as a raw material A in the following examples.
(Cacao Bean Raw Material B)

Pulp of cacao beans with pulp extracted from cacao pods was removed, and the beans were then dried and used as a raw material B in the following examples.

Comparative Example

Cacao mass was produced as a conventional cacao bean processed product through conventional fermentation, drying, roasting and grinding steps. This cacao mass was processed in a conventional hydraulic press to prepare cocoa powder having an oil content of 12% or 22%.
(Products of the Present Invention)

The raw material A or B was subjected to a heating treatment step, shell peeling step, and grinding (straining) step to obtain cacao bean processed products A1 (using the raw material A, strained through 32 mesh), A2 (using the raw material A, strained through 32 mesh and 60 mesh), B1 (using the raw material B, strained through 32 mesh), and B2 (using the raw material B, strained through 32 mesh and 60 mesh).

The steps were carried out as follows.
(Heating Treatment Step)

(1) Water in a weight corresponding to 5 times of the weight of the raw material cacao beans was put into a pot, and boiled.

(2) The raw material cacao beans were added to the boiling water prepared in (1), and the raw material cacao beans were boiled for 30 minutes in the case of the raw material A, or 1 hour in the case of the raw material B.

(3) The cacao beans were dumped into a colander to remove the water.

It was found that, as for the volume of water used for the boiling, 5 and 20 times weights of water gives no difference in the remaining ratio of polyphenols, but the boiling time affects the remaining ratio of polyphenols.
(Shell Peeling Step)

Shells were removed from the cacao beans by hand.
(Grinding Step (Straining Step))

(1) The beans were strained through a sieve (32 mesh, mesh opening was 500 µm).

(2) If necessary, the product of (1) was further strained through another sieve (60 mesh, mesh opening was 250 µm).
(Measurement of Polyphenol Content)

The polyphenol content was measured by the Folin-Ciocalteu method, and calculated as the (−)-epicatechin equivalent amount. Specifically, it was measured and calculated by the method described in "Cacao Polyphenol Measurement Method" attached to the "Labeling Standards for Cacao Polyphenols in Chocolates" of the Japan National Chocolate Industry Fair Trade Council.

In the case of using the raw material A, the polyphenol remaining ratio was calculated based on the total polyphenol content of the green beans extracted from the cacao pods, which was taken as 100%. In the case of using the raw material B, it was calculated based on the total polyphenol content of cacao beans obtained by removing pulp from cacao beans with pulp extracted from cacao pods and drying the cacao beans, which was taken as 100%.
(Measurement of Procyanidin)

Procyanidins were quantified by HPLC. Specifically, Deverosil-ODS-HG5 (4.6 mm×250 mm, φ 5µ, Nomura Chemical Co.) was used as the column. The eluent consisted of solution A and solution B, wherein the solution A was 0.1% trifluoroacetic acid aqueous solution, and the solution B was 0.1% trifluoroacetic acid/acetonitrile solution. The flow rate of the eluent passed through the column was 0.8 ml/minute, and the gradient conditions were as follows: the ratio of the solution B to the total eluent was 10% at the start, 10% after 5 minute from the start, 25% after 35 minutes from the start, 100% after 40 minutes from the start, and 100% after 45 minutes from the start. The sample injection volume was 10 µL. Epicatechin was used as a standard, and the amount of each ingredient was calculated as the epicatechin equivalent amount.

Ingredients: catechin, epicatechin, procyanidin B2, procyanidin B5, procyanidin C1, and cinnamtannin A2.

In the case of using the raw material A, the procyanidin remaining ratio was calculated based on the procyanidin content of the green beans extracted from the cacao pods, which was taken as 100%. In the case of using the raw material B, it was calculated based on the procyanidin content of cacao beans obtained by removing pulp of cacao beans with pulp extracted from cacao pods and drying the beans, which was taken as 100%.

(Measurement of Free Fat)

Free fat was measured by the following method.

(1) About 5 g of a sample (a) was put into a 50-ml centrifuge tube.

(2) n-Hexane was added in a volume of 25 ml.

(3) The tube was shaken 130 times/minute for 3 minutes with an amplitude of 4 cm.

(4) The mixture was centrifuged at 3000 rpm and 4° C. for 10 minutes.

(5) The weight (b) of a 100-ml conical flask was measured.

(6) The supernatant obtained in (4) mentioned above was transferred onto filter paper, and filtered, and the filtrate was collected in the 100-ml conical flask.

(7) n-Hexane was evaporated by blowing nitrogen gas.

(8) n-Hexane was evaporated by holding the residue in a vacuum constant temperature dryer at 98° C. for 4 hours under reduced pressure.

(9) The weight (c) of the conical flask was measured after air-cooling in a desiccator.

Free fat content based on sample weight (%)= $(c-b)/a \times 100$

Free fat content based on oil content (%)=<x>/oil in $a \times 100$

Free fat content based on solid content (%)=<x>/(a−moisture in $a) \times 100$ (Comparative Observation for Oil Seepage)

Approximately 2 g of the 60-mesh strained cacao beans (cacao beans processed product A2), cacao mass, and melted commercial milk chocolate were each weight in a microtube, centrifuged (16,000 rpm for 10 minutes), and separation of oil from each material was visually observed.

(Structure Observation)

Observation was performed with a microscope by the following procedure.

(1) A sample was placed on slide glass.

(2) n-Hexane was dropped.

(3) A methylene blue solution was dropped.

(4) An iodine solution was dropped.

(5) The sample was observed with a microscope.

Observation was also performed with a confocal microscope by the following procedure.

(1) A sample was placed on slide glass.

(2) A Nile Mix staining solution was dropped.

(3) Cover glass was placed.

(4) The sample was observed with a confocal microscope.

Nile Mix Staining Solution: 2% Ultrapure water was added to 1,2-propanediol, and they were mixed to prepare a solvent. Nile Red (0.02 g) and Nile Blue A (0.01 g) were added to the above solvent, the volume of the mixture was adjusted to 1 L, and the mixture was stirred for 1 hour or longer.

(Measurement of Undisrupted Cell Ratio)

The ratio of undisrupted cells was measured and calculated by the following procedure.

(1) A measurement sample (0.03 g) was put into a conical tube, 2 ml of ultrapure water was added, the mixture was stirred, 0.5 ml of a 0.01% methylene blue solution (methylene blue trihydrate (molecular formula, $C_{16}H_{18}N_3SCl \cdot 3H_2O$; molecular weight, 373.90) was dissolved and diluted in ultrapure water to prepare 0.01% (w/v) methylene blue solution) was further added, the mixture was stirred, then the resulting solution was dropped onto slide glass, cover glass was placed thereon, and the sample was observed with a microscope (magnification, 450×).

(2) From the image, the following "regional area (A)" and "number of disrupted cells (B)" were obtained by using the image analysis software "ImageJ" (free software, available for download from URL: https://imagej.net/Welcome, version 1.50).

Regional area (A): After the image was made binary, it was analyzed as "Area" by using the "Analyze" function. The hollow parts formed by difference in light at the time of binarization were filled with "Fill holes" for the analysis.

Number of disrupted cells (B): Disrupted cells were visually selected from the image, and manually counted by using the "Cell Counter" function.

(3) The area of one undisrupted cell (C) was calculated as an approximate value by assuming the cell to be a circle with a radius of 10 μm ($10 \times 10 \times 3.14 = 314$ μm$^2$).

(4) The regional area (A) was divided by the area of one undisrupted cell (C) to obtain the total cell count (D).

The ratio of undisrupted cells in cacao bean cells (%) was calculated in accordance with the following equation. Values were calculated for 5 or more of regions where the total number of cells (D) was in the range of 100 to 300, and an average value was obtained.

Ratio of undisrupted cells in cacao bean cells (%)=(D−B)/D×100

(Particle Size Distribution)

The particle size distribution was measured with a particle size analyzer (laser diffraction type particle size distribution analyzer SALD-220 0 (Shimadzu Corporation)). The vertical axis of the distribution spectrum represents the relative amount of particles in terms of %, which indicates the ratio of the volume distribution of each particle size to the total volume, and the horizontal axis represents the particle size in terms of μm.

(Moisture)

The moisture content was measured by the method described on the Web page of the Consumer Affairs Agency of Japan, "Appendix: Food Labeling" (http://www.caa.go.jp/policies/policy/food_labeling/food_labeling_act/pdf/foods_inde x_18_180119_0003.pdf), "Appendix: Analysis Methods and Others of Nutritional Ingredients etc.", 5. Carbohydrates, a. Moisture, (3) Vacuum heating and drying method.

(Oil Content)

The oil content was measured by the method described on the Web page of the Consumer Affairs Agency of Japan, "Appendix: Food Labeling (http://www.caa.go.jp/policies/policy/food_labeling/food_labeling_act/pdf/foods_inde x_18_180119_0003.pdf), "Appendix: Analysis Methods and Others of Nutritional Ingredients etc.", 2. Lipids, (1) Ether extraction method.

Results

The measurement results are shown in the following table.

membranes remained, and the presence of starch grains that had expanded with water contained in the inside of the cells could be confirmed (FIG. 1b). Also in the cacao beans ground after the heating treatment, the cell membranes

TABLE 1-1

| Test group | Moisture % | Oil content % | Free fat (in sample) % | Free fat (based on solid content) % | Free fat (based on oil content) % | Polyphenol remaining ratio (based on solid content) % | Procyanidin remaining ratio (based on solid content) % |
|---|---|---|---|---|---|---|---|
| Cacao beans processed product A1 (32 mesh strained) | | | | | | 93-98 | — |
| Cacao bean processed product A2 (60 mesh strained) | 51.8 | (26) | 1.7 | 3.5 | 6.5 | 93-98 | 77-91 |
| Cacao bean processed product B1 (32 mesh strained) | 39.8 | (33) | 6.0 | 10.0 | 18.2 | 79-82 | — |
| Cacao bean processed product B2 (60 mesh strained) | 38.5 | (34) | 9.4 | 15.3 | 27.6 | 79-82 | — |
| Comparative Example: Cacao mass | 3.3-4.0 | (55) | 41.2-44.3 | 42.6-46.1 | 74.9-80.5 | 40-68 | 16-21 |
| Comparative example: Cocoa powder (oil content 12%) | 3.9 | (12) | 8.4 | 8.7 | 70.0 | | — |
| Comparative example: Cocoa powder (oil content 22%) | 3.8 | (22) | 17.1 | 17.8 | 77.7 | | — |

Whereas the cacao mass and cocoa powder, which are conventional cacao bean processed products, had a free fat ratio higher than 70% based on the oil content, the products of the present invention had an extremely lower free fat ratio lower than 30%.

In addition, whereas the remaining ratio of polyphenols in the cacao mass, which is a conventional cacao bean processed product, was 40 to 51%, it was higher than 70% in the products of the present invention. Thus, the products of the present invention had extremely higher remaining ratios compared with the materials obtainable by the conventional processing method. In addition, whereas the remaining ratio of procyanidins was 16 to 21% in the cacao mass, which is a conventional cacao bean processed product, it was higher than 70% in the product of the present invention. Thus, the product of the present invention had extremely higher procyanidin remaining ratio compared with the material obtainable by the conventional processing method.

By the microscopic observation, in the cacao beans after the heating treatment, it could be confirmed that the cell membranes remained, and the ingredients in the inside of the cells were retained (FIG. 1c). On the other hand, in the cacao mass, the cell membranes were disrupted, and the ingredients that had been contained in the inside of the cells were released (FIG. 1d).

By the confocal microscopic observation, presence of lipids in the cells could be confirmed for the unprocessed cacao beans, and in the products of the present invention, it could be confirmed that the locations of proteins and lipids were the same, thus the cells were not disrupted, and the lipids remained in the cells. On the other hand, in the cacao mass, the locations of proteins and lipids were different (FIG. 2c), therefore the cells were disrupted, and the lipids and proteins that had existed in the cells were released.

The results of the calculation of the ratios of undisrupted cells (undisrupted cell ratio) are shown in the following table.

TABLE 1-2

| Region No. | 3 | 4 | 5 | 6 | 9 | 10 | 12 |
|---|---|---|---|---|---|---|---|
| Area (μm²) | 61810.707 | 83222.869 | 77067.879 | 71996.571 | 89213.617 | 83472.037 | 36307.900 |
| Total cell count (cells) | 197 | 265 | 245 | 229 | 284 | 266 | 116 |
| Disrupted cell count (cells) | 67 | 57 | 48 | 51 | 66 | 65 | 37 |

TABLE 1-2-continued

| Region No. | 3 | 4 | 5 | 6 | 9 | 10 | 12 |
|---|---|---|---|---|---|---|---|
| Disrupted cell ratio (%) | 34.04 | 21.51 | 19.56 | 22.24 | 23.23 | 24.45 | 32.00 |
| Undisrupted cell ratio (%) | 65.96 | 78.49 | 80.44 | 77.76 | 76.77 | 75.55 | 68.00 |

The ratio of undisrupted cacao bean cells in the cacao bean cells of the cacao bean processed product B2 was calculated to be 74.7% in average on the basis of the results shown in the table mentioned above.

As for the particle size distribution, whereas the cacao mass had a peak in the range of 5 to 10 μm of the particle diameter (FIG. 3b), the product of the present invention (cacao bean processed product A2, 60 mesh strained) had a large particle size of about 20 μm or larger, unlike the cacao mass (FIG. 3a). In FIG. 3a, 100% of the particles were in the range of 10 μm to 1.5 mm, indicating that the particle size distribution of the cacao bean processed product A2 was within the range of 10 μm to 1.5 mm.

The median diameter of the product of the present invention (FIG. 3a) was 318.8 μm, the mode diameter of the same was 391.7 μm, and the mean diameter of the same was 269.9 μm. The median diameter of the cacao mass (FIG. 3b) was 7.4 μm, the mode diameter of the same was 7.5 μm, and the mean diameter of the same was 6.8 μm.

Further, as for oil seepage, separated oil was observed for the cacao mass and melted commercial milk chocolate, but no oil separation was observed in cacao bean processed product A2.

[Chocolate]

Chocolate was produced with the following composition in a conventional manner by using a powdered cacao bean processed product with a moisture content of 3% or lower, which was obtained by drying the cacao bean processed product in a vacuum dryer at 98° C. for 2 hours.

TABLE 2

|  | Mixing ratio (%) |
|---|---|
| Commercial chocolate*[1] | 80 |
| Processed cacao bean processed product B1 (powder)*[2] | 20 |
| Total | 100 |

*[1]Product name "Chocolate Kouka Cacao 72%" (Meiji Co., Ltd.), total polyphenol content 25.4 mg/g.
*[2]Powdered cacao bean processed product mentioned above with a moisture content lower than 3%.
Total polyphenol content was 70.0 mg/g.

The total polyphenol content of this chocolate was 34.4 mg/g, and this chocolate had an equivalent polyphenol content, but less bitterness and less astringency compared with a commercially available high polyphenol content chocolate (product name "Chocolate Kouka Cacao 95%" (Meiji Corporation), total polyphenol content 34.8 mg/g).

[Anko (Sweet Bean Paste)]

Anko was produced by adding powdered sugar to the cacao bean processed product B2, and mixing them. The composition is shown in the table mentioned below.

TABLE 3

|  | Mixing amount (g) | Mixing ratio (%) |
|---|---|---|
| Cacao bean processed product B2 | 60 | 60.00 |
| Powdered sugar | 40 | 40.00 |
|  | 100 | 100.00 |

The obtained anko apparently did not show any oil separation, despite the fact that it contained a lot of oil (about 20%). It also contained a lot of polyphenols.

[Yokan]

Yokan was produced with the following composition.

TABLE 4

|  | Mixing amount (g) | Mixing ratio (%) |
|---|---|---|
| Cacao bean processed product B2 | 60 | 31.58 |
| Granulated sugar | 70 | 36.84 |
| Brown cane sugar | 7.5 | 3.95 |
| Agar | 2.5 | 1.32 |
| Water | 50 | 26.31 |
|  | 190 | 100.00 |

(Procedure)

(1) Water and agar were combined, and heated in a pot until boiling.

(2) When the mixture boiled and agar was completely dissolved, sugar was added and dissolved by boiling.

(3) The cacao beans processed product was added, they were evenly mixed, and heated them until the mixture briskly boiled.

(4) The mixture was removed from heat, poured into a mold, slightly cooled at room temperature, and refrigerated.

The obtained yokan did not show oil separation in spite of its high oil content (about 10%). It also contained a lot of polyphenols.

[Spread]

Spread was produced with the following composition.

TABLE 5

|  | Mixing amount (g) | Mixing ratio (%) | Mixing amount (g) | Mixing ratio (%) |
|---|---|---|---|---|
| Cacao bean processed product B1 | 80 | 33.99 | 44.13 | 22.46 |
| Granulated sugar | 67.44 | 28.66 |  | 18.93 |
| Brown cane sugar | 7.23 | 3.07 |  | 2.03 |
| Cooking salt A | 0.67 | 0.28 |  | 0.19 |
| Water A | 80 | 34.00 |  | 22.46 |
| Water B |  | 0.00 | 10.00 | 14.98 |
| Agar |  | 0.00 | 0.20 | 0.30 |
| Cacao extract A |  | 0.00 | 0.58 | 0.87 |
| Cooking salt B |  | 0.00 | 0.04 | 0.06 |
| Unsalted butter |  | 0.00 | 2.82 | 4.22 |
| Vanillin |  |  | 0.06 | 0.09 |

TABLE 5-continued

|  | Mixing amount (g) | Mixing ratio (%) | Mixing amount (g) | Mixing ratio (%) |
|---|---|---|---|---|
| Cacao extract B |  |  | 0.29 | 0.43 |
| Sweetened condensed milk |  |  | 8.67 | 12.98 |
|  | 235.34 | 100.00 | 66.79 | 100.00 |

(Procedure)

(1) The water A was boiled, and granulated sugar, brown cane sugar and cooking salt A were dissolved.

(2) After dissolution, the cacao bean processed product B1 was added, they were evenly mixed, and heated until it briskly boiled.

(3) The mixture was strained through 60 mesh.

(4) The water B, agar and cacao extract A were combined, and the mixture was heated in a pot until it boiled.

(5) After the mixture boiled and the agar completely dissolved, the resultant of (3) was added, and they were evenly mixed and heated until it briskly boiled.

(6) To a bowl containing the cooking salt B, butter (assuming salted butter), vanillin, sweetened condensed milk, and the cacao extract B, the resultant of (5) was added, and they were mixed.

(7) After mixing well, the mixture was poured into a mold, slightly cooled, and cooled in a refrigerator.

The obtained spread did not show oil separation, despite the high oil content thereof (about 12%). It also contained high levels of polyphenols.

[Powder]

The cacao bean processed product A1 was dried at 98° C. for 2 hours under reduced pressure to reduce the moisture content to 3% or lower, and then it was passed through a 32-mesh sieve to complete powder.

The obtained powder apparently did not show any oil oozing despite of its oil content of about 55%. In addition, when dispersed in water, whereas conventional cocoa powder and cacao mass showed oil dissolution from them, the obtained powder did not show oil dissolution from it. Moreover, the obtained powder gave less bitterness and less astringency compared with cocoa powder and cacao mass. It also contained a large amount of polyphenols.

[Pasta (Fresh Noodles)]

Pasta was produced in the following composition.

TABLE 6

|  | Mixing amount (g) | Mixing ratio | Raw material moisture content |
|---|---|---|---|
| Strong flour (light flour) | 100 | 57.1% | 13.0% |
| Olive oil (salad oil) | 4 | 2.3% | 0.0% |
| Egg | 50 | 28.6% | 89.0% |
| Salt | 2 | 1.1% | 0.0% |
| Powder mentioned above | 19 | 10.9% | 40.0% |
| Total | 175 | 100.0% | 37.2% |

(Procedure)

(1) The flow was sieved and weighed.

(2) The olive oil, egg, salt and powder were added, and they were mixed by such a movement like cutting the mixture.

(3) When they were mixed in a crumbled state, the mixture was kneaded into dough by hand.

(4) When the dough approximately got a consistency of earlobe, it was divided in half, and each was round into a ball, wrapped with plastic wrap, and set aside (at least 15 minutes).

(5) The dough was sufficiently floured and stretched.

(6) After the dough was rolled out to a required thickness, it was cut into noodles.

(7) The noodles were boiled in boiling water to complete the pasta.

[Smoothie]

Smoothie was produced with the following composition.

TABLE 7

|  | Mixing amount (g) | Mixing ratio (%) |
|---|---|---|
| Cacao bean processed product B1 | 17.00 | 17.24 |
| Granulated sugar | 11.33 | 11.50 |
| Cooking salt | 0.15 | 0.15 |
| Water | 70.00 | 71.01 |
| Emulsifier (Ryoto Sugar Ester P-1670) | 0.10 | 0.10 |
|  | 98.58 | 100.00 |
| Cacao content |  | 10.35 |

(Procedure)

(1) The granulated sugar, cooking salt and emulsifier were dissolved in water, and the mixture was combined with the cacao bean processed product B1.

(2) They were mixed until they become a uniform mixture to complete smoothie.

[Measurement of Polyphenol Content, etc. of Cacao Beans That Have Undergone Different Treatments]

(Samples 1 to 3)

Sample 1: Green beans with pulp (unfermented, not dried, and not roasted)

Sample 2: Cacao nibs (fermented, dried, but not roasted)

Sample 3: Cacao nibs (fermented, dried, and roasted)

Each sample was subjected to a heating treatment by boiling with water under the conditions mentioned in to the following table, the shell of the sample 1 was removed, polyphenols, procyanidins, and moisture were measured by the method described above, and the polyphenol content and procyanidin content based on the solid content were determined: The results are shown in the following table.

TABLE 8

|  | Boiling heating treatment conditions | Polyphenol content (% based on solid content) | Procyanidin content (% based on solid content) |
|---|---|---|---|
| 1-1 | Green beans | 3.0 | 1.0 |
| 1-2 | 100° C., 15 minutes | 4.6 | 1.9 |
| 1-3 | 100° C., 30 minutes | 3.7 | 1.5 |
| 2-1 | Cacao nibs (not roasted) | 3.1 | 0.4 |
| 2-2 | 100° C., 15 minutes | 2.0 | 0.3 |
| 2-3 | 100° C., 30 minutes | 1.8 | 0.2 |
| 3-1 | Cacao nibs (roasted) | 2.9 | 0.3 |
| 3-2 | 100° C., 15 minutes | 2.1 | 0.2 |
| 3-3 | 100° C., 30 minutes | 2.0 | 0.2 |

(Samples 4 to 6)

Sample 4: Unfermented beans (dried, but not roasted)

Sample 5: Unfermented beans (not dried and not roasted)

Sample 6: Fermented beans

Each sample was dried and roasted, if necessary, and then subjected to a heating treatment by boiling with water under the conditions mentioned in the following table, and polyphenols, procyanidins, and moisture content were measured by the methods described above. The polyphenol content and procyanidin content based on the solid content are shown in the following table.

TABLE 9

| | Boiling heating treatment conditions | Polyphenol content (% based on solid content) | Procyanidin content (% based on solid content) |
|---|---|---|---|
| 4-1 | Unfermented beans | 6.4 | 3.6 |
| 4-2 | 100° C., 30 minutes | 6.8 | 3.3 |
| 4-3 | 100° C., 60 minutes | 5.6 | 2.7 |
| 4-4 | 100° C., 120 minutes | 4.1 | 1.7 |
| 5-1 | Unfermented beans | 3.8 | 1.6 |
| 5-2 | 100° C., 30 minutes | 3.7 | 1.6 |
| 5-3 | 100° C., 60 minutes | 3.6 | 1.2 |
| 5-4 | 100° C., 120 minutes | 1.8 | 0.7 |
| 6-1 | Fermented beans | 2.1 | 0.5 |
| 6-2 | After drying | 1.6 | 0.3 |
| 6-3 | After drying and roasting, sieved and ground through 32 mesh without heating by boiling | 1.66 | 0.3 |

(Samples 7 to 10)

Sample 7: Unfermented beans (pulp was removed by hand)

Sample 8: Unfermented beans (pulp was removed by water washing)

Sample 9: Unfermented beans (pulp was removed by hand)

Sample 10: Unfermented beans (pulp was removed by water washing)

Each sample was subjected to a heating treatment by boiling in water, then water was removed, and the shell was removed. The polyphenols, procyanidins, and moisture content of the beans strained through a 32-mesh sieve (32 MePass product) or strained through a 32-mesh sieve and a 65-mesh sieve (65 MePass product) were determined by the methods described above, and the polyphenol content and procyanidin content based on the solid content were determined. The results are shown in the following table.

TABLE 10

| | | Polyphenol content (% based on solid content) | Procyanidin content (% based on solid content) |
|---|---|---|---|
| 7-1 | Green beans (pulp was removed) | 5.0 | — |
| 7-2 | 32MePass product | 4.3 | 1.5 |
| 7-3 | 65MePass product | 3.6 | 1.1 |
| 8-1 | Green beans (pulp was removed) | 7.8 | — |
| 8-2 | 32MePass product | 6.8 | — |
| 8-3 | 65MePass product | — | — |
| 9-1 | Green beans (pulp was removed) | 5.6 | — |
| 9-2 | 32MePass product | — | — |
| 9-3 | 65MePass product | 3.6 | — |
| 10-1 | Green beans (pulp was removed) | 6.1 | — |
| 10-2 | 32MePass product | 5.6 | — |
| 10-3 | 65MePass product | — | — |

(Samples 11 to 15)

Sample 11: Unfermented beans (pulp was removed by hand)

Sample 12: Unfermented beans (pulp was removed by water washing)

Sample 13: Fermented beans

Sample 14: Unfermented beans (pulp was removed by water washing)

Sample 15: Fermented beans

Each sample was subjected to a heating treatment by boiling in water (100° C., 1 hour), then water was removed, and the shell was removed. Each sample was strained through a 32-mesh sieve and thereby made into flakes (32MePass product). The flakes were dried in a reduced pressure dryer to a moisture content of 3% or lower, and passed through a 32-mesh sieve (powder). Polyphenols, procyanidins, and moisture were measured by the methods described above, and the polyphenol content and procyanidin content based on the solid content were determined. The results are shown in the following table.

TABLE 11

| | | Polyphenol content (% based on solid content) | Procyanidin content (% based on solid content) | Free fat content (% based on solid content) |
|---|---|---|---|---|
| 11-1 | Unfermented beans (pulp was removed) | 6.6 | — | — |
| 11-2 | 32MePass product | — | — | 3.1 |
| 11-3 | Powder | 5.7 | — | 23.1 |
| 12-1 | Unfermented beans (pulp was removed) | 7.8 | — | — |
| 12-2 | 32MePass product | — | — | 4.2 |
| 12-3 | Powder | 6.8 | 2.2 | 21.8 |
| 13-1 | Fermented beans (pulp was removed) | 5.0 | — | — |
| 13-2 | 32MePass product | — | — | 9.5 |
| 13-3 | Powder | 3.7 | 0.5 | 26.1 |
| 14-1 | Unfermented beans | 7.0 | — | — |
| 14-2 | 32MePass product | — | — | 6.9 |
| 14-3 | Powder | 6.1 | — | 25.1 |
| 15-1 | Fermented beans | 5.7 | — | — |
| 15-2 | 32MePass product | — | — | 2.0 |
| 15-3 | Powder | 5.1 | — | 26.7 |

[Measurement of Breaking Strength]

The breaking strength of heated cacao beans was measured.

Material and Method

The production procedures of the samples A to D are shown below.

A: Unfermented Dried Cacao Beans

Unfermented beans (dried beans) were dried in a vacuum dryer at 100° C. for 4 hours.

B: Unfermented Roasted Cacao Beans (1) Unfermented beans (dried beans) were roasted in a roaster at 126° C. for 40 minutes.

(2) The beans were dried in a vacuum dryer at 100° C. for 4 hours.

C: Unfermented Boiled (1 Hour) and Dried Cacao Beans (1) Unfermented beans (dried beans) were boiled in boiling water for 1 hour.

(2) The beans were dried in a vacuum dryer at 100° C. for 4 hours.

D: Unfermented Boiled (2 Hours) and Dried Cacao Beans (1) Unfermented beans (dried beans) were boiled in boiling water for 2 hours.

(2) The beans were dried in a vacuum dryer at 100° C. for 4 hours.

The breaking strength was measured under the following conditions.

Equipment used: FUDOH rheometer RTC-3010D-CW
S. ADJ (penetration depth): 4.0 mm
T. SPEED (penetration speed): 2 cm/minute
Plunger: Cylindrical shape having a diameter of 3 mm
Measurement method: Each sample (whole cacao beans) was placed at the center of the stand, and the sample temperature was measured at 22 to 24° C.

Results

The results are shown in the following table.

TABLE 12 n = 50

|  | Moisture content % | Average kgf | Standard deviation kgf |
|---|---|---|---|
| A. Dried green cacao beans | 3.3 | 3.46 | 1.21 |
| B. Hot air-roasted cacao beans | 2.2 | 3.54 | 1.05 |
| C. Boiling-heated (1 hour) cacao beans | 2.8 | 2.28 | 0.59 |
| D. Boiling-heated (2 hours) cacao beans | 1.8 | 1.94 | 0.52 |

The breaking strength of cacao beans was markedly reduced by heating by boiling. The breaking strength was also reduced by increasing the boiling time.

The invention claimed is:

1. A composition comprising an unroasted, wet-heated ground product having a particle size distribution in the range of 10 μm to 1.5 mm, the ground product containing 30% or more of undisrupted cacao bean cells, and the ground product having a free fat content of 30% or lower based on oil content.

2. The composition according to claim 1, wherein the ground product has a breaking strength of 3 kgf or lower.

3. The composition according to claim 1, which is in the form of paste.

4. The composition according to claim 1, which is in the form of powder.

5. The composition according to claim 1, which has a polyphenol content of 1 to 10% by weight based on solid content.

6. The composition according to claim 1, wherein the ground product is obtained from a process comprising:
heating raw material cacao beans in the presence of moisture to obtain heating treated cacao beans, and
grinding the resulting heating treated cacao beans in the presence of moisture to obtain the unroasted, ground product having a particle size distribution in the range of 10 μm to 1.5 mm.

7. The composition according to claim 1, wherein the ground product is obtained from a process comprising:
heating raw material cacao beans in the presence of moisture to obtain heating treated cacao beans,
drying the resulting heating treated cacao beans, and
grinding the dried cacao beans to obtain the unroasted, ground product having a particle size distribution in the range of 10 μm to 1.5 mm.

8. A food containing the composition according to claim 1.

9. A method for producing a composition comprising an unroasted, ground product containing undisrupted cacao bean cells, the method comprising:
heating raw material cacao beans in the presence of moisture to obtain heating treated cacao beans, and
grinding the resulting heating treated cacao beans to obtain an unroasted, ground product having a particle size distribution in the range of 10 μm to 1.5 mm, the unroasted, ground product containing 30% or more of undisrupted cacao bean cells.

* * * * *